United States Patent [19]

Idestrom et al.

[11] 3,728,026

[45] Apr. 17, 1973

[54] MEANS FOR MEASURING DISTANCE WHEN IT IS CONSIDERED PROBABLE THAT FOREIGN OBJECTS OR PARTICLES ARE BETWEEN THE MEASURING INSTRUMENT AND THE OBJECT TO WHICH THE DISTANCE IS TO BE MEASURED

[75] Inventors: Erik Idestrom; Bernt Ling; Anders Persson, all of Vasteras, Sweden

[73] Assignee: Allmanna Svenska Elektriska Aktiebolaget, Vasteras, Sweden

[22] Filed: Nov. 8, 1971

[21] Appl. No.: 196,324

[30] Foreign Application Priority Data

Dec. 10, 1970 Sweden .....................16692/70

[52] U.S. Cl...........................356/5, 343/13, 340/1 R
[51] Int. Cl. ...............................................G01c 3/08
[58] Field of Search .......................356/4, 5; 343/13, 343/7.5; 340/1 R, 1 C, 1 L

[56] References Cited

UNITED STATES PATENTS 3,503,680   3/1970   Schenkerman...........................356/5

Primary Examiner—Benjamin A. Borchelt
Assistant Examiner—S. C. Buczinski
Attorney—Jennings Bailey, Jr.

[57] ABSTRACT

An arrangement for measuring distance under conditions when disturbances of various types may be expected to occur between the measuring instrument and the object to which the distance is to be measured comprises an emitter unit arranged to emit a series of electro-magnetic pulses in the direction of the object and a receiver unit, which only registers the very first echo from each single pulse emitted, and the echo which of all those registered has covered the longest distance is considered to comprise a measurement of the distance to the object in question.

5 Claims, 3 Drawing Figures

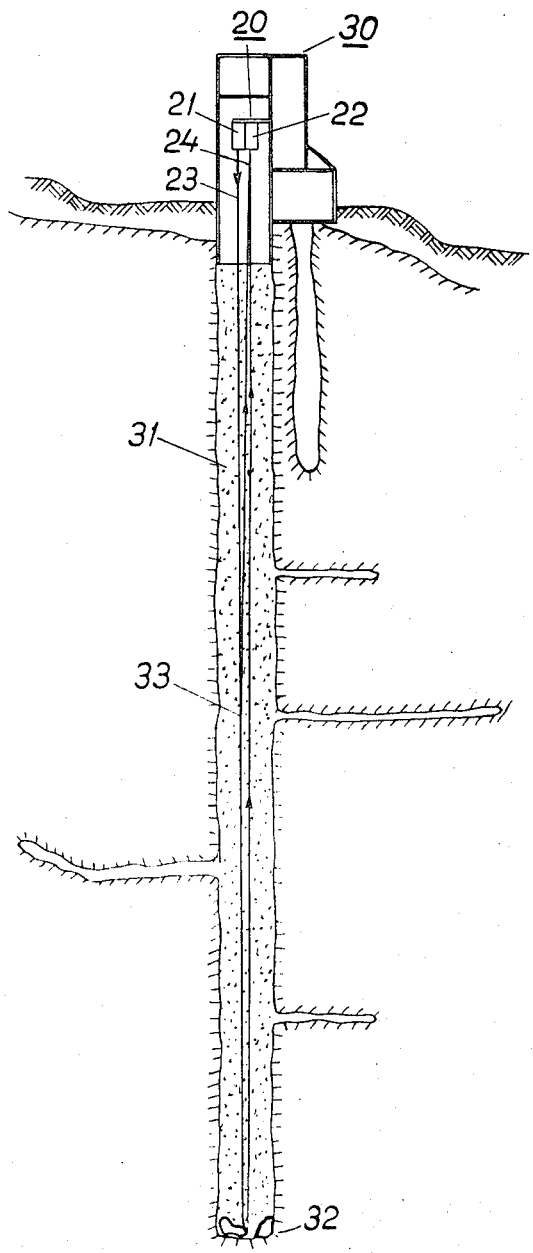

MEANS FOR MEASURING DISTANCE WHEN IT IS CONSIDERED PROBABLE THAT FOREIGN OBJECTS OR PARTICLES ARE BETWEEN THE MEASURING INSTRUMENT AND THE OBJECT TO WHICH THE DISTANCE IS TO BE MEASURED

BACKGROUND OF THE INVENTION

1. Field of the Invention

The invention relates to a means for measuring distance when it is considered probable that foreign objects or particles are between the measuring instrument and the object to which the distance is to be measured.

2. The Prior Art

When distances are being measured with the help of an instrument generating signals and registering echoes, it may be quite impossible to measure the distance to the object in question because of the echoes obtained from objects or particles located between the point from which the signals are emitted and the object itself.

Devices are known where the problem discussed above has been taken into consideration. One such device comprises an emitter unit which emits only one pulse in the direction of the object to which the distance is to be measured. The device comprises a receiver member which registers all the echoes generated by the pulse emitted, the echo which has covered the longest distance being assumed to constitute a measurement of the correct distance to the object.

A considerable number of complicated registering devices are required in order to register all the echoes generated by a pulse.

There is also great uncertainty as to whether the value obtained really does constitute the correct distance. The only thing which can be determined with any certainty is that this constitutes the greatest measuring value obtained from all those originating from a single pulse emitted. It is therefore quite probable that the pulse emitted is never able to penetrate to the intended object and that the measuring value obtained may very well be a measurement of a distance shorter than the distance to the object.

SUMMARY OF THE INVENTION

The present invention relates to a device for measuring distance by means of which the correct distance to the object can be measured with certainty.

The characteristics of the device include an emitter unit arranged to emit a series of electro-magnetic pulses in the direction of the object and a receiver unit, which only registers the very first echo from each single pulse emitted, and the echo which of all those registered has covered the longest distance is considered to comprise a measurement of the distance to the object in question.

The device according to the invention is intended for use under conditions when disturbances of various types may be expected to occur between the measuring instrument and the object to which the distance is to be measured, these disturbances giving rise to mis-leading echo registrations. It is also assumed that there is no other such object further away than the object in question.

The signal device mentioned suitably comprises a semi-conductor laser arranged to emit a series (for example 1000) of high frequency pulses on each measuring occasion in the direction of the object to which the distance is to be determined. The receiver unit included in this signal device is then arranged, although each pulse emitted generates a plurality of echoes, to register only one echo from each pulse, that is the first echo obtained. Thus, if 1000 pulses are emitted, 1000 echoes will be received, these echoes being the first of each of the pulses emitted. Echoes are thus obtained from all objects and particles located between the emitter and the object, as well as at least one echo from the object in question. Since the number of pulses emitted is great, and they are furthermore emitted at high frequency, it is very likely that at least some of the pulses can penetrate through the "cloud" of "impurities" in front of the object and reach the object in question.

The receiver unit is so arranged that the echo, out of all those registered by the receiver, which has covered the longest distance constitutes a measurement of the distance to be measured.

BRIEF DESCRIPTION OF THE DRAWINGS

The device according to the invention will be further described with reference to the accompanying drawings in which FIG. 3 shows a device according to the invention applied above a mine shaft.

DESCRIPTION OF THE PREFERRED EMBODIMENTS

Figure 1:
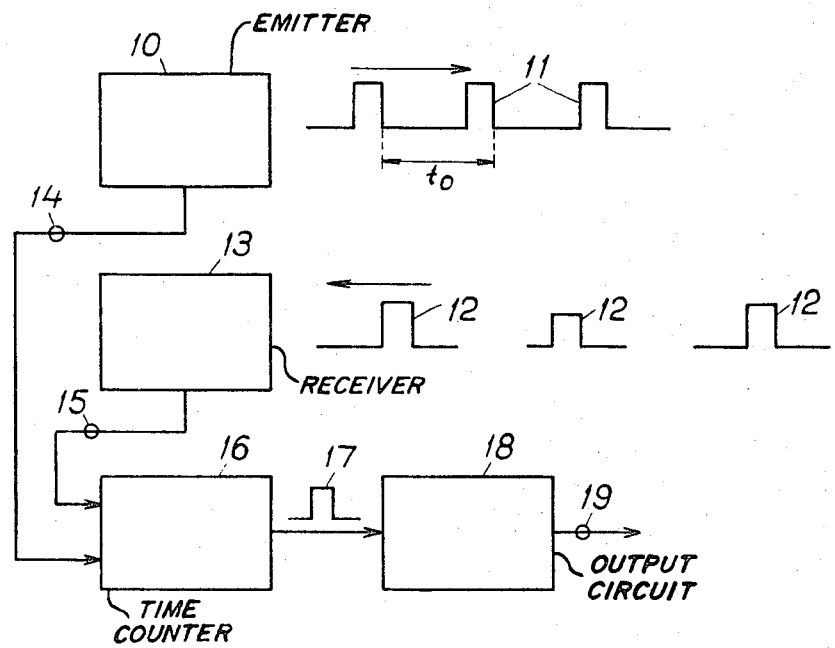
FIG. 1 shows a circuit diagram of the device according to the invention.

FIG. 1 shows an emitter unit 10 which emits pulses 11 where $t_o$ is the time lag between two pulses 11. The pulses 11 are reflected against objects and echo pulses 12 are generated, which are transmitted to a receiver 13. When a pulse 11 is emitted from the emitter 10, it emits a starting signal 14 to a time counter 16 which then starts to register the time passing before the first echo 12 is received by the receiver 13, which then emits a stop pulse 15 to the time counter 16. The content of the time counter 16 is then fed in the form of a time pulse 17 to an output circuit 18 which is arranged to compare each time pulse coming in with the subsequent time pulses and memorizes the longest time pulse of all. When all the pulses coming in have been compared, a signal 19 is obtained at the output of the output circuit 18. This signal 19 thus constitutes a measurement of the longest time pulse received by the circuit 18. The circuit 18 will be further described in connection with FIG. 2.

The time lag $t_o$ between the pulses 11 is assumed here to be greater than the measuring rang of the receiver 13 so that no mistake can be made between the echoes 12 from the different pulses 11. A usual value for $t_o$, when the emitter consists of a laser emitter, is about 20 msec.

Since the receiver 13 emits a stop pulse 15 to the counter 16 upon receipt of the first echo 12, only the first echo generated by a pulse 11 is measured, which then gives rise to a time pulse 17. Time pulses cannot therefore be obtained for the other echoes from the same pulse 11 since, after this stop pulse, the counter 16 does not receive any new starting pulse until the next pulse from the emitter 10 has been emitted.

Figure 2:
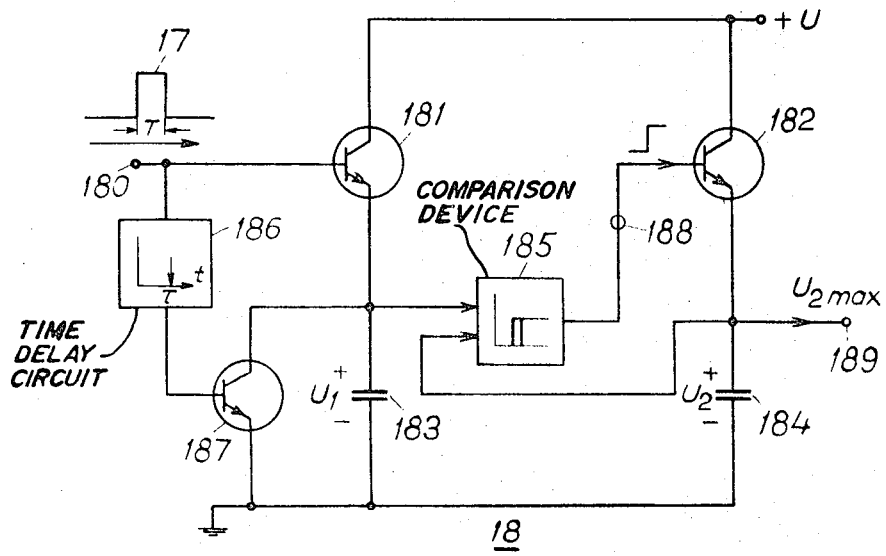
FIG. 2 shows the principle of an output circuit included in a device according to the invention.

An example of the design of the output circuit 18 is shown in FIG. 2. A time pulse 17 enters the input 180 of the circuit. This pulse 17 is fed to a switch, here exemplified by a transistor element 181, the collector being connected to a constant voltage source U. This pulse 17 on the base of the transistor 181 causes the capacitor 183 to be charged to a certain voltage $U_1$, which thus corresponds to the length T of the time pulse 17. This voltage $U_1$, together with a voltage $U_2$ over another capacitor 184, is fed into a comparison device 185. The voltage $U_2$ corresponds to the previously obtained longest pulse. If $U_1 < U_2$, the voltage $U_2$ over the capacitor 184 is maintained and if $U_1 > U_2$, that is the time pulse corresponding to $U_1$ is longer than the time pulse corresponding to $U_2$, a triggering signal 188 is emitted from the comparison device 185 and supplied to the base of a transistor switch 182, the collector of which is connected to the same constant voltage source U as the transistor 181. The capacitor 184 is thus charged to the new voltage $U_1 > U_2$. A certain time, $\tau$, after a time pulse 17 has been obtained at the input 180, the capacitor 183 is discharged through a transistor switch 187 which obtains a start signal on its base from the input 180 through a time delay circuit 186 having a time delay of $\tau$, where $t_o < \tau < T$. The voltage $U_2$max which, after all the time pulses 17 have been received by the output circuit 18, finally lies over the capacitor 184 thus constitutes a measurement of the longest time pulse obtained during the measurement, which time pulse in its turn constitutes a measurement of the distance a to the object, whereby for example $a = C \cdot T/2$ where C is the speed at which the laser pulses 11 are emitted and T is the actual length of the time pulse.

The units comprising the device may consist of emitter, receiver and time counter as is seen from F. Frungel: "High Speed Pulse Technology", vol II, chap. L.6., Academic Press, where the emitter consists of a single pulse laser which in the present case can be replaced by a quickly pulsing laser, for example a semiconductor laser. The comparison device and the time delay circuit suitably consist of a differential amplifier, for example uA 710 Fairchild, and a monostable switch, for example 9601 Fairchild, respectively.

A device in accordance with the invention is therefore extremely advantageous for use in mine shaft measurements, for example, as can be seen from FIG. 3.

In FIG. 3 a signal member 20 is applied in a pithead building 30 at the top of a mine shaft 31. The signal member 20 consists of an emitter unit 21 and a receiver unit 22. Pulses emitted from the emitted unit 21 are indicated by the line 23 and echoes received by the receiver unit, by the lines 24. 33 indicates an undesirable reflection point in the shaft 31. The desired reflection point is at the bottom 32 of the shaft. In a mine shaft irregularities in the walls and bottom, loose objects at the bottom, dust in the shaft, and the like can generate undesired echoes.

The device according to the invention offers an evaluation of the measuring values which is extremely simple and does not require any complicated extra equipment. It can be used with great reliability for measuring distances where there are obstacles between the measuring instrument and the object for the measurement.

We claim:

1. Means for measuring distance comprising a signal member including an emitter unit and a receiver unit, said emitter unit including means to emit a series of high frequency pulses towards an object, said receiver unit including means to register only the first echo of each pulse emitted, and means associated with the receiver unit to give an output signal proportional to that echo which of all those registered has covered the longest distance, thereby comprising a measurement of the distance to the object in question.

2. Means according to claim 1, in which said emitter unit comprises a pulsed semi-conductor laser.

3. Means according to claim 1, in which said receiver unit comprises a time-measuring device including means to measure the time which passes between the emission of a pulse from said emitter unit and the receipt of the first echo generated by said pulse, and to emit an output signal in the form of a time pulse which comprises a measurement of the time measured.

4. Means according to claim 3, in which said receiver unit comprises an output device to which said time pulse is transmitted and which includes means to emit an output signal constituting a measurement of the longest of the time pulses transmitted to the output device, this pulse constituting a measurement of the distance to the object in question.

5. Means according to claim 1, which includes means responsive to the first echo of each pulse to render the receiver unit inoperative to receive any further echoes of such pulse.

* * * * *